United States Patent [19]
Cullen et al.

[11] Patent Number: 5,609,126
[45] Date of Patent: Mar. 11, 1997

[54] VARIABLE CAMSHAFT TIMING SYSTEM WITH ALTITUDE COMPENSATION

[75] Inventors: Michael J. Cullen, Northville; Alan R. Dona, Huntington Woods; Eric L. Clinton, Southfield; Larry A. Hardy, Riverview, all of Mich.

[73] Assignee: Ford Motor Company, Dearborn, Mich.

[21] Appl. No.: 655,278

[22] Filed: May 15, 1996

Related U.S. Application Data

[63] Continuation of Ser. No. 316,747, Oct. 3, 1994, abandoned.

[51] Int. Cl.$^6$ ................................. F01L 1/34; F01L 13/00
[52] U.S. Cl. ........................ 123/90.15; 123/90.17
[58] Field of Search ........................... 123/90.15, 90.16, 123/90.17, 90.31

[56] References Cited

U.S. PATENT DOCUMENTS

| | | | |
|---|---|---|---|
| 3,714,932 | 2/1973 | Meacham et al. | 123/90.15 |
| 4,368,705 | 1/1983 | Stevenson et al. | 123/358 |
| 5,078,107 | 1/1992 | Morikawa | 123/295 |
| 5,117,784 | 6/1992 | Schechter et al. | 123/90.17 |
| 5,222,465 | 6/1993 | Sakamoto et al. | 123/90.17 |
| 5,243,935 | 9/1993 | Kano et al. | 123/90.17 |
| 5,279,272 | 1/1994 | Kruger | 123/86 |
| 5,333,577 | 8/1994 | Shinojima | 123/90.17 |
| 5,357,932 | 10/1994 | Clinton et al. | 123/488 |

*Primary Examiner*—Weilun Lo
*Attorney, Agent, or Firm*—Lorraine S. Melotik; Roger L. May

[57] ABSTRACT

An electronic engine controller operates to control the phase angle of a variable position camshaft. The engine controller receives signals indicative of engine coolant temperature, aircharge temperature, throttle position, engine speed and camshaft position, and generates a camshaft position signal to a variable camshaft control actuator to alter the phase angle of the camshaft with respect to the engine crankshaft. The engine controller contains two tables which contain cam phase angles. The first table contains a plurality of values indexed by engine speed and engine aircharge and the second table contains a plurality of values indexed by engine speed and throttle position. The engine controller generates the camshaft position signal in one of three manners depending on the mode of engine operation. In a first mode of engine operation the camshaft position signal is generated as a function of engine coolant temperature and aircharge temperature. In a second mode of engine operation, the camshaft position signal is generated as a function of the values contained in the aforesaid first and second tables, and in a third mode of engine operation the camshaft position signal is generated as a function of a predetermined default value.

10 Claims, 4 Drawing Sheets

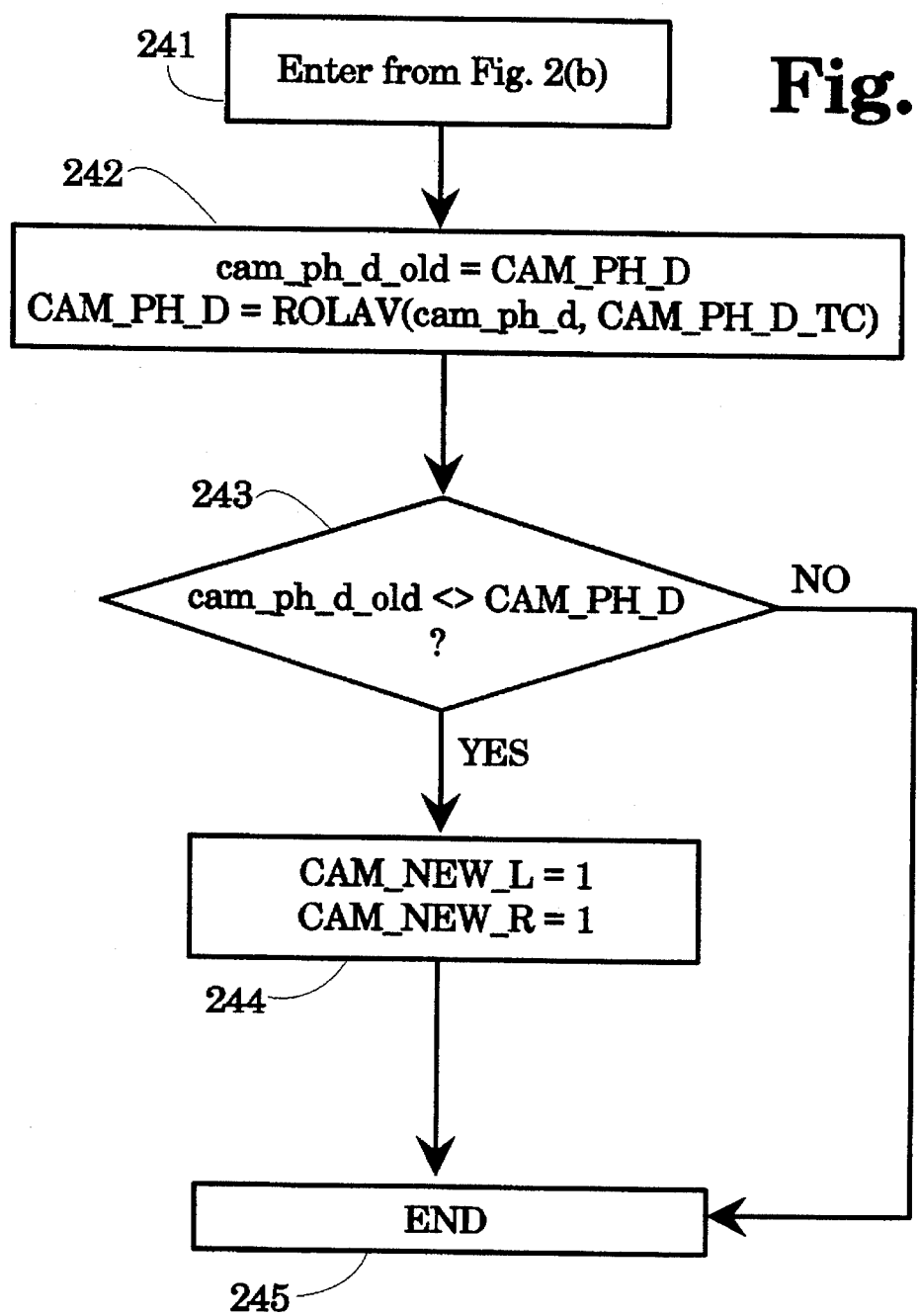

VARIABLE CAMSHAFT TIMING SYSTEM WITH ALTITUDE COMPENSATION

This application is a continuation of application Ser. No. 08/316,747 filed Oct. 3, 1994, now abandoned.

FIELD OF THE INVENTION

This invention relates to the field of electronic engine control and more particularly to the field of controlling the position of a variable position camshaft.

BACKGROUND OF THE INVENTION

Variable cam timing systems operate to vary the timing between the camshaft and the crankshaft to optimize engine performance over the entire range of engine operation. Systems such as that described in U.S. Pat. No. 5,117,784 to Schechter et al., vary the timing between the camshaft and crankshaft to achieve improved idle stability, expanded torque curve and the RPM (revolutions per minute) range of the engine, full control of emission gases and elimination of certain emissions, and elimination of external exhaust gas recirculation components and circuitry.

It is known that optimal cam timing for fuel economy and emissions may be achieved by determining the timing as a function of engine speed and aircharge entering the engine in lbs/cylinder filling. Optimal cam timing for performance may be achieved by determining the cam timing as a function of engine speed and throttle position. Either of the aforesaid control methods can generate cam timing to achieve satisfactory fuel economy, emissions and performance for a particular altitude, usually sea level. However, as the altitude at which a vehicle is operated increases a control method calibrated for sea level operation provides less than optimal results because the aircharge entering the engine at a given throttle position decreases. Exclusive use of throttle position to determine cam timing causes too much retard and charge dilution at low aircharge levels. Exclusive use of aircharge to determine cam timing causes too much retard at high throttle angles and peak power is not achieved.

Accordingly, there is a need for a variable cam timing system which provides optimal fuel economy, emissions and performance at a variety of altitudes.

SUMMARY OF THE INVENTION

It is an object of the present invention to control the timing of a variable camshaft to achieve optimum fuel economy, emissions and performance under a variety of engine operating conditions.

In accordance with the primary object of the invention, in a preferred embodiment, a cam phase angle which alters the timing of a variable camshaft is generated by generating an engine speed value which is indicative of the rotational speed of the engine, generating an aircharge value indicative of the aircharge entering the engine, and generating a throttle position value indicative of the throttle position of the engine. A first intermediate camshaft phase angle is then retrieved as a function of the engine speed value and the aircharge value and a second intermediate camshaft phase angle is retrieved as a function of the engine speed value and the throttle position value. The first intermediate camshaft phase angle is compared to the second intermediate camshaft phase angle, and the cam phase angle is determined as a function of the camshaft phase angle which corresponds to the least amount of camshaft timing retard.

An advantage of certain preferred embodiments is that by utilizing camshaft timing values as a function of different input variables, engine operation is optimized for fuel economy, emissions and performance at all altitudes.

These and other features and advantages of the present invention may be better understood by considering the following detailed description of a preferred embodiment of the invention. In the course of this description, reference will frequently be made to the attached drawings.

BRIEF DESCRIPTION OF THE DRAWINGS

FIGS. 2(a), 2(b) and 2(c) are flowcharts showing the operation of a preferred embodiment.

DETAILED DESCRIPTION

Figure 1:
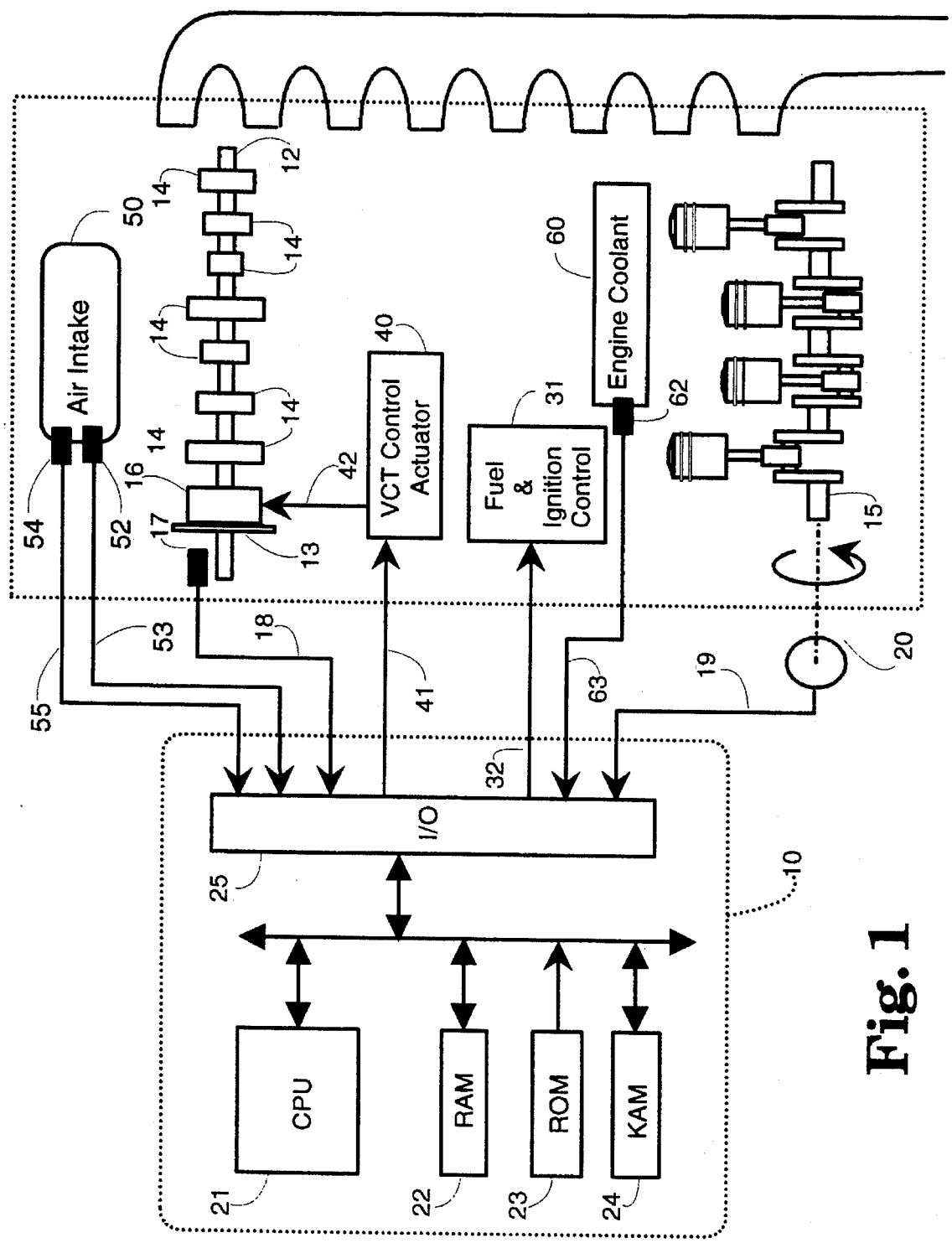
FIG. 1 of the drawings shows a portion of an internal combustion engine and electronic engine controller which embody the principles of the invention.

In FIG. 1 of the drawings an internal combustion engine comprises a variable position camshaft 12 capable of altering the positional relationship of cam lobes 14 to crankshaft 15. Such a variable position camshaft is described in U.S. Pat. No. 5,117,784 to Schechter et al. FIG. 1 shows for explanation purposes a single variable position camshaft. It is understood that engines utilizing either an in-line cylinder configuration or a V-type cylinder configuration may utilize multiple camshafts of the type shown in FIG. 1. A pulsewheel 13 positioned on a drive gear 16 of the camshaft 12 comprises a plurality of teeth (not shown) positioned in fixed relationship to the cams 14 on the camshaft 12. A VRS sensor 17, of known type, detects the angular rotation of the teeth on the pulsewheel 13 as the camshaft rotates and generates a representative Variable Cam Timing/Cylinder Identification (VCT/CID) signal 18. VCT control actuator 40 receives camshaft position signal 41, which is indicative of a cam phase angle in degrees from a default phase angle, from EEC 10 and generates a camshaft control signal 42 used to control the angular position of cams 14 relative to crankshaft 15. Camshaft position signal 41 preferably takes the form of a duty cycle signal to reduce sensitivity to voltage fluctuations. A Crankshaft Position Sensor (CPS) 20 generates a CPS signal 19 indicative of the rotational speed of the crankshaft 15. A throttle position sensor 52 of known type positioned in air intake 50 generates a throttle position signal 53 which is indicative of the position of the throttle (not shown), and aircharge temperature sensor 54 generates an aircharge temperature signal 55 which is indicative of the temperature of the aircharge entering air intake 50. An engine coolant temperature sensor 62 of known type generates an engine coolant temperature signal 63 which is indicative of the temperature of engine coolant circulating through the engine.

An electronic engine control (EEC) module 10 comprises a central processing unit 21, a read-only memory (ROM) 23 for storing control programs, a random-access memory (RAM) 22 for temporary data storage, a keep-alive-memory (KAM) 24 for storing learned values and a conventional data bus. The EEC 10 receives the VCT/CID signal 18, the CPS signal 19, engine coolant temperature signal 63, throttle position signal 53, and aircharge temperature signal 55 and generates control signals 32 to control the amount of fuel injected by injectors within the engine, and control the spark ignition of an air/fuel mixture within the combustion chambers of the engine. EEC 10 generates digital values which correspond to the information received from signals 18, 19,

63, 53 and 55. A VCT/CID value is generated from VCT/CID signal 18, an RPM value is generated from CPS signal 19, an ECT value is generated from engine coolant temperature signal 63, a throttle position value is generated from throttle position signal 53 and and ACT value is generated from aircharge temperature signal 55. The EEC 10 also controls the relationship of the two input signals 18, and 19 by generating a cam phase angle which is transmitted via camshaft position signal 41 from the EEC, to the VCT control actuator 40.

Figure 2A:
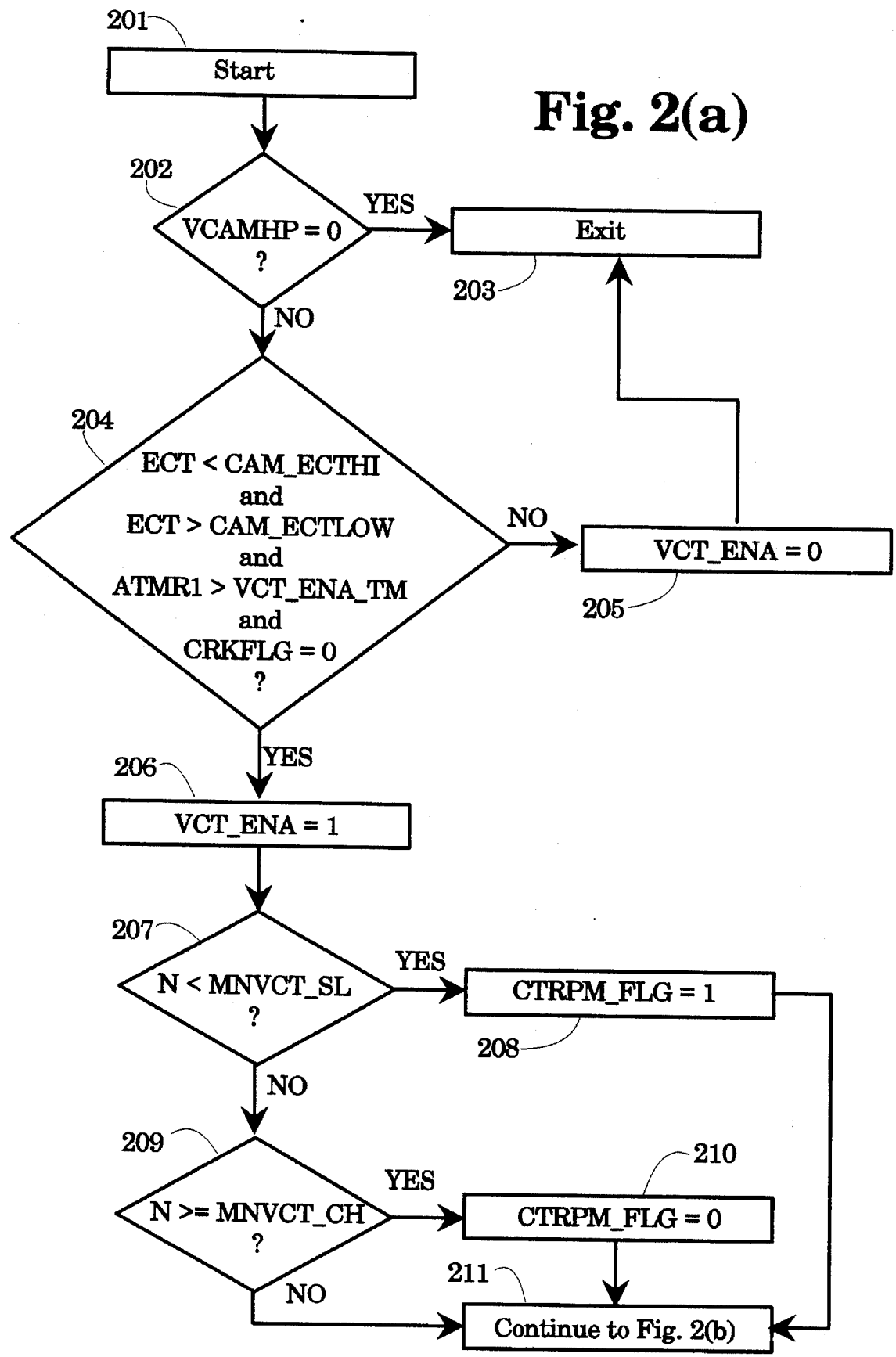

A preferred embodiment advantageously determines a cam phase angle and generates camshaft position signal 41 as a function of the cam phase angle in a manner which optimizes fuel economy, emissions and performance at all altitudes, by executing the camshaft timing routine shown in FIGS. 2(*a*), 2(*b*) and 2(*c*). The steps in FIGS. 2(*a*), 2(*b*) and 2(*c*) are preferably executed by EEC 10 in a background loop. The camshaft timing routine is initiated in FIG. 2(*a*) at 201. At 202 a calibration constant VCAMHP, which indicates whether VCT hardware is present in the engine is checked. VCAMHP is preferably a binary value with a value of one indicating that VCT hardware is present. If VCAMHP is found to be equal to zero, then the routine determines that VCT hardware is not present in the engine and the routine is exited at 203. Otherwise, at 204, a test is performed to determine if the engine is within an operating range in which variable camshaft timing may be enabled. A preferred embodiment utilizes variable camshaft timing once the engine has been operating a predetermined minimum amount of time from engine crank and is operating within a predetermined engine coolant temperature range. Variable ECT which is indicative of the temperature of engine coolant indicated by engine coolant temperature signal 63 is compared against two constants: CAM_ECTHI and CAM_ECTLOW, which represent respectively, maximum and minimum engine coolant operating temperatures for operation of variable camshaft timing. Also at 204, variable ATMR1 which is representative of the time elapsed since exiting crank mode is checked against constant VCT_ENA_TM which is indicative of a minimum amount of time elapsed from crank mode before variable camshaft timing may begin. Finally, at 204, flag CRKFLG is checked to determine if the engine is in crank mode. CRKFLG has a value of one if the engine is in crank mode and a value of zero otherwise. If the engine coolant temperature is within the predetermined range, the engine is not in crank mode and the predetermined amount of time has elapsed since crank mode, then at 206, a VCT enabling flag, VCT_ENA is set to a value of one and the routine is continued. Otherwise, at 205, VCT_ENA is set to zero and the routine is exited. If VCT_ENA is set to zero then variable cam timing is disabled and the camshaft is positioned at a predetermined default angle with respect to the crankshaft. In a preferred embodiment, the default angle is a value which corresponds to the most advanced cam timing allowed by the characteristics of the engine.

At 207 and 209 tests are performed to determine if a closed throttle VCT mode should be enabled. In a preferred embodiment a closed throttle VCT mode is used primarily at selected RPMs such as idle to minimize emissions while maintaining driveability. At 207, engine speed variable N which is indicative of the rotational speed of the engine in revolutions per minute (RPM) is compared to constant MNVCT_SL which is indicative of an engine speed, in RPMs, below which closed throttle VCT mode may be enabled. If N is less than MNVCT_SL then at 208, a flag CTRPM_FLG is set to a value of one to indicate that the engine speed is low enough to enable closed throttle VCT mode. At 209, when N is greater than MNVCT_SL, N is compared to constant MNVCT_CH which is indicative of an engine speed at which closed throttle VCT mode will be disabled. If N is greater than or equal to MNVCT_CH then at 210 flag CTRPM_FLG is set to a value of zero to indicate engine speed is too high to operate in closed throttle VCT mode. Otherwise, for N between MNVCT_CH and MNVCT_SL, CTRPM_FLG is not altered and as seen at 211, the routine proceeds to the steps shown in FIG. 2(*b*).

At steps 223, 225 and 226, a desired cam phase angle is determined in one of three ways depending upon the results of tests performed at steps 222 and 224, which determine the operational mode of the engine. In a preferred embodiment, the routine, through steps 222 and 224 determines the engine to be operating in one of three modes: closed throttle VCT mode, normal mode, and high engine speed mode. At 222, VCT_ENA and CTRPM_FLG are checked to ensure that variable cam timing and closed throttle VCT mode are enabled. Also at 222, a throttle mode value APT is checked to determine the position of the throttle. APT has a value of minus 1 (−1) at closed throttle, a value of zero at part throttle and a value of one at wide open throttle. If at 222, variable cam timing and closed throttle VCT mode are found to be enabled and the engine is operating in closed throttle VCT mode, then at 223 desired cam phase angle value cam_ph_d is determined as a function of engine coolant temperature and aircharge temperature. As seen at 223, cam_ph_d is determined by adding a first value FN550(ECT) to a second value FN551(ACT). In a preferred embodiment, first value FN550(ECT) is obtained from a one-dimensional table of stored, empirically determined values which are indexed by engine coolant temperature value ECT. Second value FN551(ACT) is similarly preferably retrieved from a one-dimensional table of stored, empirically determined values which are indexed by aircharge temperature. In a preferred embodiment both tables are stored in ROM 23. As will be appreciated by those skilled in the art in view of the present disclosure, generation of a desired cam phase angle as a function of engine coolant temperature and aircharge temperature in the manner shown in step 223, when the engine is operating in closed throttle VCT mode, advantageously generates a cam timing angle which provides optimum emissions and driveability at all engine coolant temperatures.

If any of the conditions at 222 are found to be not true, then at 224, the value of VCT_ENA is checked and the engine speed is checked by comparing engine speed variable N to constant MXNVCT which is indicative of a maximum acceptable engine speed, in RPMs, for variable cam timing to be utilized. If variable cam timing is enabled (VCT_ENA=1) and if the engine speed, N is less than MXNVCT then the engine is determined to be operating in normal mode and at 225, desired cam phase angle value cam_ph_d is determined as the minimum of a value provided by an economy function which generates a desired cam phase angle as a function of engine speed and engine aircharge and a performance function which generates a desired cam phase angle as a function of engine speed and relative throttle position. As seen at 225, cam_ph_d is determined by taking the minimum of a first value, FN5520(N, LOAD) and a second value FN5521(N, TP_REL).

In a preferred embodiment, first value FN5520(N, LOAD) is obtained from a two-dimensional table of stored, empirically determined values which are indexed by engine speed N and engine aircharge LOAD, where LOAD is normalized cylinder aircharge. The cam phase angles contained in the table are indicative of cam timing which provide minimum fuel consumption while achieving government regulated emissions and acceptable combustion stability. As will be appreciated by those skilled in the art in view of the present disclosure, such cam phase angles advantageously provide limited cam retard to provide the aforementioned advantages. The two-dimensional table FN5520 will hereafter be referred to as the economy table.

Second value FN5521(N, TP_REL) is similarly preferably retrieved from a two-dimensional performance table of stored, empirically determined values which are indexed by engine speed N and relative throttle position TP_REL, where TP_REL is throttle position measured from a throttle body hard set of the engine. The cam phase angles contained in the performance table are indicative of cam timing which provides good driveability. As will be appreciated by those skilled in the art in view of the present disclosure, the combined use of economy table FN5520 and performance table FN5521, under the conditions tested at steps 222 and 224, advantageously provide limited cam retard at high throttle positions to maintain good driveability and power and ensure a smooth transition to the cam timing necessary for maximum power, particularly when the vehicle is driven at high altitudes where aircharge is reduced. In a preferred embodiment the economy table and the performance table are both stored in ROM 23.

In an alternative embodiment, desired cam phase angle cam_ph_d is generated at step 225 as a function of a value retrieved from economy table FN5520, an interpolater value retrieved from a interpolator table, and a wide-open throttle value retrieved from a wide-open throttle table. The interpolator table contains a plurality of interpolator values, indexed by engine speed N and throttle position TP_REL. Preferably the interpolator values have a value between zero and one, with a value of one indicating a high throttle position and a value of zero indicating a low throttle position. The wide-open throttle table contains a plurality of wide-open throttle values each of which is indicative of a desired cam phase angle at a particular engine speed, when the engine is being operated in the high engine speed mode. In such an embodiment, the desired cam phase angle cam_ph_d is generated by the following relationship:

$$cam\_ph\_d = FN5520(N, LOAD) * (1-VCTINTERP) + VCTWOT * VCTINTERP$$

where, FN5520(N, LOAD) is a cam phase angle retrieved from economy table FN5520, VCTINTERP is a interpolator value retrieved from the interpolator table, and VCTWOT is a wide-open throttle value retrieved from the wide-open throttle table.

In the above relationship, interpolator value VCTINTERP will equal zero at low throttle positions, and consequently, cam_ph_d will equal the value retrieved from economy table FN5520. At high throttle positions interpolator value VCTINTERP will equal one, and consequently, cam_ph_d will equal the wide-open throttle value VCTWOT. For partial throttle positions, the interpolator value will have a value between zero and one and will effect an interpolation of the desired cam phase angle from the values stored in the economy table and the wide-open throttle table. As will be appreciated by those skilled in the art, a cam phase angle generated in the above manner, advantageously provides optimum cam timing for situations in which the optimum cam timing for power is not always more advanced than the optimum cam timing for emissions.

If the conditions at 224 are not satisfied, then the engine is determined to be operating in high engine speed mode and at 226, desired cam phase angle cam_ph_d is set equal to a predetermined cam phase angle ADVCAM which preferably corresponds to the most advanced cam timing allowed by the characteristics of the engine.

Figure 2B:
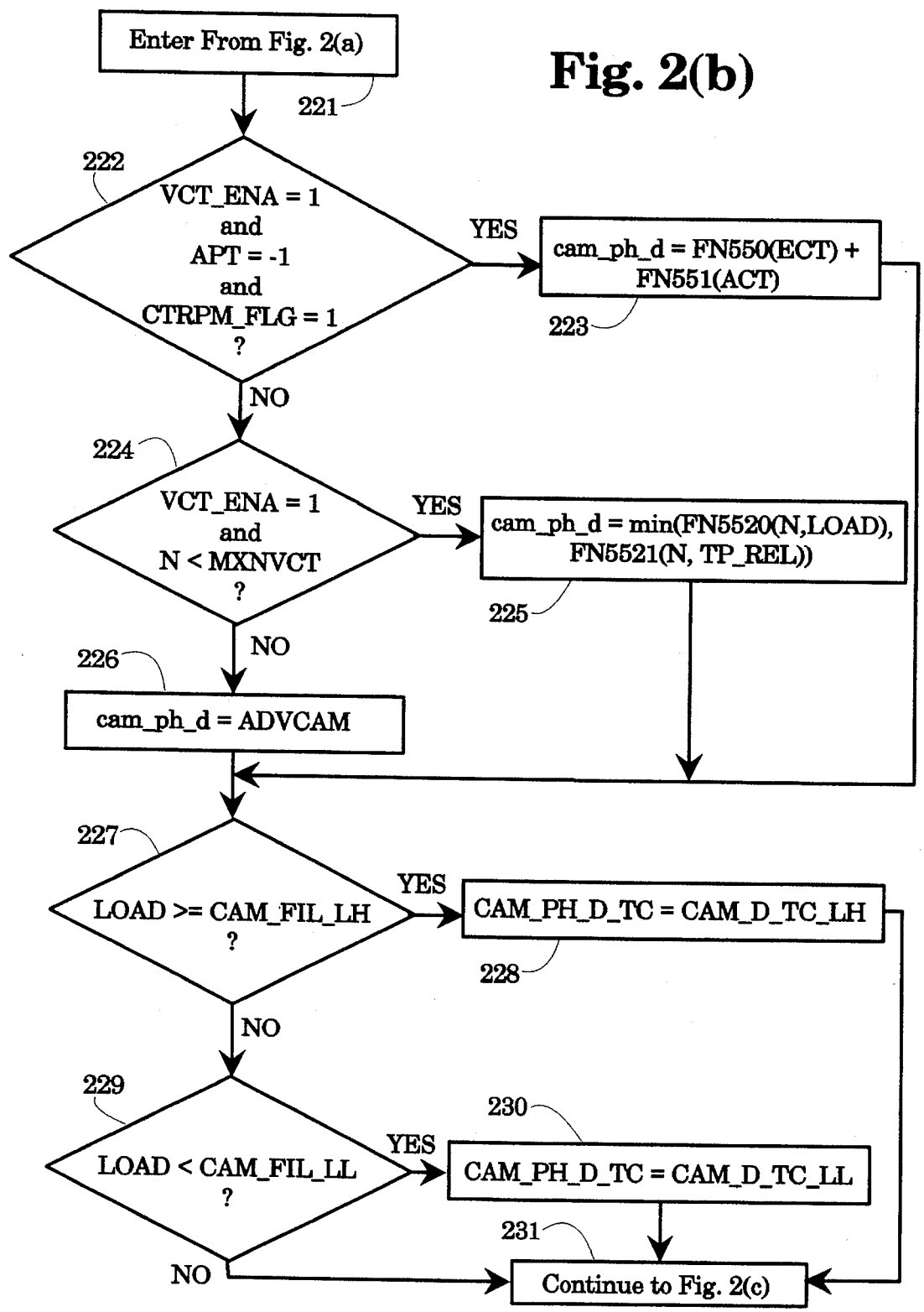

Once a desired cam phase angle is determined at steps 222 through 226, the desired cam phase angle is filtered at steps 227 through 230 in FIG. 2(b) and steps 242 through 244 in FIG. 2(c). As will be appreciated by those skilled in the art in view of the present disclosure, such a function advantageously improves vehicle driveability by minimizing the effects of excessively high frequency changes in input parameters such as engine speed, engine coolant temperature, throttle position, and aircharge temperature on the cam phase angle.

At steps 227 through 230 a filtering time constant CAM_PH_D_TC is determined as a function of the engine aircharge as represented by the variable LOAD. A preferred embodiment advantageously selects a filter time constant depending upon engine aircharge. If at 227, LOAD is greater than or equal to a constant CAM_FIL_LH then at 228, filter time constant CAM_PH_D_TC is set equal to a first time constant CAM_D_TC_LH. Otherwise, at 229, LOAD is compared to a constant CAM_FIL_LL, and at 230, CAM_PH_D_TC is set equal to a second time constant CAM_D_TC_LL if LOAD is less than CAM_FIL_LL. Otherwise if aircharge is within the range established by CAM_FIL_LL and CAM_FIL_LH then filter time constant CAM_PH_D_TC is maintained at its existing value. Constants CAM_FIL_LH and CAM_FIL_LL establish an upper and lower limit, respectively, for a range which advantageously avoids rapid fluctuation of time constants.

In FIG. 2(c), at 242, an actual cam phase angle CAM_PH_D is generated by filtering desired cam phase angle cam_ph_d as a function of filter time constant CAM_PH_D_TC. The filtering is advantageously performed by taking the rolling average of desired cam phase angle cam_ph_d as a function of filter time constant CAM_PH_D_TC. As can be seen at 242, the value of actual cam phase angle CAM_PH_D is stored by setting variable cam_ph_d_old equal to CAM_PH_D.

At 243, the former actual cam phase angle cam_ph_d_old is compared to the present actual cam phase angle CAM_PH_D to determine if camshaft position signal 41 requires alteration in order to command VCT control actuator 40 to alter the angular position of camshaft 12 in accordance with actual cam phase angle CAM_PH_D. If at 243, cam_ph_d_old is not equal to CAM_PH_D, then at 244, flags CAM_NEW_L and CAM_NEW_R are set to a value of one to indicate that a new unused cam phase angle is available. If CAM_NEW_L and CAM_NEW_R are set to a value of one then camshaft position signal 41 will be altered in a separate VCT command routine to command VCT control actuator 40 to change the position of camshaft 12. VCT command routine is initiated periodically by checking the value of CAM_NEW_L and CAM_NEW_R and continuing to alter the camshaft position signal 41 if either of the flags has a value of one. Once camshaft position signal 41 is altered, CAM_NEW_L and CAM_NEW_R are set to a value of zero to indicate that the position of camshaft 12 corresponds to the value of actual cam phase angle CAM_PH_D. As will be appreciated by those skilled in the art in view of the present disclosure, values CAM_NEW_R and CAM_NEW_L are required for an engine which utilizes two camshafts. In an engine which utilize a single camshaft, one of the aforesaid flags are not required.

If at 243, cam_ph_d_old is found to equal CAM_PH_D, then the value of CAM_NEW_L and CAM_NEW_R is not altered and the routine is exited at 243. In such a situation, camshaft position signal 41 will not be altered by the VCT command routine.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. In a vehicle engine which includes a variable cam timing system for altering the angular position of a camshaft to advance and retard camshaft timing from a base camshaft position, a method for determining a cam phase angle for said camshaft comprising the steps of:

generating an engine speed value indicative of the rotational speed of said engine;

generating an aircharge value indicative of the aircharge entering said engine;

generating a throttle position value indicative of the throttle position of said engine;

retrieving a first camshaft phase angle as a function of said engine speed value and said aircharge value;

retrieving a second camshaft phase angle as a function of said engine speed value and said throttle position value;

comparing said first camshaft phase angle to said second camshaft phase angle; and determining said cam phase angle as a function of the camshaft phase angle which corresponds to the least amount of camshaft timing retard.

2. The method as set forth in claim 1 wherein the vehicle is operated in a plurality of operating modes including a closed throttle Variable Cam Timing (VCT) mode, a normal mode and a high engine speed mode and wherein the steps of said method are executed in said normal mode.

3. The method as set forth in claim 2 comprising the additional step of generating an engine temperature signal which is indicative of the temperature of said engine, and determining said cam phase angle as a function of a predetermined default phase angle when said engine temperature signal indicates an engine temperature below a predetermined minimum temperature.

4. The method as set forth in claim 3 wherein the engine temperature signal is indicative of the temperature of an engine coolant within said engine.

5. The method as set forth in claim 4 wherein the step of determining said cam phase angle comprises the steps of determining a desired phase angle as a function of the camshaft phase angle which corresponds to the least amount of camshaft timing retard, generating a rolling average of said desired phase angle and a filter value, and determining said cam phase angle as a function of said rolling average.

6. The method as set forth in claim 5 wherein the step of generating a rolling average of said desired phase angle and a filter value comprises the step of determining said filter value as a function of engine aircharge.

7. The method as set forth in claim 6 wherein the step of determining said filter value as a function of engine aircharge comprises the steps of comparing an engine aircharge value which is indicative of engine aircharge to a minimum aircharge value and to a maximum aircharge value, and determining said filter value as a function of a first predetermined filter value if said engine aircharge value is greater than or equal to said maximum aircharge value, and determining said filter value as a function of a second predetermined filter value if said engine aircharge value is less than said minimum aircharge value.

8. The method as set forth in claim 2 comprising the additional steps of:

generating an engine coolant temperature value indicative of the temperature of engine coolant within said engine;

generating an aircharge temperature value indicative of the temperature of an aircharge entering the engine; and if said engine is operating in said closed throttle VCT mode, retrieving a first closed throttle camshaft phase angle as a function of said engine coolant temperature value;

retrieving a second closed throttle camshaft phase angle as a function of said aircharge temperature value; and determining said cam phase angle as the sum of said first closed throttle camshaft phase angle and said second closed throttle camshaft phase angle.

9. The method as set forth in claim 8 comprising the additional step of determining said cam phase angle as a function of a predefined cam phase angle if said engine is operating in said high engine speed mode.

10. A variable camshaft timing system comprising:

means for generating an rpm signal indicative of the rotational speed of said engine;

means for generating an aircharge signal indicative of engine aircharge;

means responsive to said rpm signal and to said aircharge signal for generating a first cam timing value indicative of a first camshaft phase angle;

means for generating a throttle position signal indicative of engine throttle position;

means responsive to said rpm signal and to said throttle position signal for generating a second cam timing value indicative of a second camshaft phase angle; and means for comparing said first camshaft phase angle to said second camshaft phase angle and for generating a phase angle for said camshaft which corresponds to the least amount of camshaft timing retard.

* * * * *